United States Patent Office 2,863,864
Patented Dec. 9, 1958

2,863,864

3-OXO-3,4-DIHYDRO-1,4,2-BENZOTHIAZINE-2-ACETIC ACID AMIDES AND PREPARATION THEREOF

Frederick K. Kirchner, Delmar, N. Y., assignor to Sterling Drug Inc., New York, N. Y., a corporation of Delaware No Drawing. Application June 20, 1956
Serial No. 592,489

13 Claims. (Cl. 260—243)

This invention relates to new amides and to methods of preparation thereof. More particularly, the invention concerns novel amides of 2-(carboxymethyl)-3-oxo-3,4-dihydro-1,4,2-benzothiazine.

In the past, 3-oxo-3,4-dihydro-1,4,2-benzothiazines substituted in the 2-position have been described in the literature. However, they are few in number and do not include any compositions having an amide substituent in the 2-position. According to the present invention new and useful compounds are obtained when the benzothiazine nucleus is attached through the 2-position by a methylene bridge to a carbamyl or substituted carbamyl radical.

The compounds of the invention are represented by the following formula

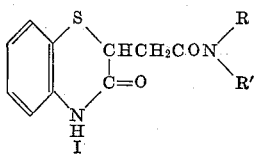

I wherein R is a member of the group consisting of hydrogen, alkyl and cycloalkyl groups, and R' is a member of the group consisting of hydrogen, alkyl, phenyl and phenyl substituted by one or more substituents. The numbering system used is in accordance with the standard nomenclature used in the Ring Index and in Chemical Abstracts.

When R and R' in the above general Formula I are alkyl groups, they preferably have from one to about eight carbon atoms and thus can be methyl, ethyl, propyl, isopropyl, butyl, isobutyl, pentyl, isopentyl, hexyl, isohexyl, heptyl, isoheptyl, octyl, tertiary octyl and the like.

The group R can likewise represent a cycloalkyl radical having from five to about eight carbon atoms and thus can be cyclopentyl, 2-methylcyclopentyl, cyclohexyl, 2,6-dimethylcyclohexyl, cycloheptyl, cyclooctyl and the like.

In the above general Formula I the group R' can also be an unsubstituted phenyl radical or a phenyl radical substituted by from one to three substituents selected from the group consisting of lower-alkyl, lower-alkoxy, lower-alkylmercapto, lower-alkylsulfonyl, carbohydrazide, carbo-lower-alkoxy and halogen radicals. Furthermore, these substituents can be on any of the available positions of the phenyl ring, and when more than one substituent they can be the same or different and occupy any of the various position combinations relative to each other. When the phenyl ring is substituted by lower-alkyl, lower-alkoxy, lower-alkylmercapto, lower-alkyl-sulfonyl or carbo-lower-alkoxy groups, these groups preferably have from one to about four carbon atoms and thus include such radicals as methyl, ethyl, n-propyl, isopropyl, butyl, tertiary-butyl and the like for lower-alkyl; methoxy, ethoxy, propoxy, isopropoxy, butoxy, isobutoxy and the like for lower-alkoxy; methylmercapto, ethylmercapto, propylmercapto, butylmercapto, isobutyl-mercapto and the like for lower-alkylmercapto; methyl-sulfonyl, ethylsulfonyl, propylsulfonyl, isopropylsulfonyl, butylsulfonyl, isobutylsulfonyl and the like for lower-alkylsulfonyl; and carbomethoxy, carbethoxy, carbopropoxy, carbisopropoxy, carbobutoxy and the like for carbo-lower-alkoxy.

A particularly preferred aspect of the invention includes compounds in which R is a hydrogen atom and R' is a phenyl radical substituted by from one to three halogen atoms. The halogen substituent can be any of the halogens fluorine, chlorine, bromine or iodine.

The compounds of the invention are prepared by reacting a maleic acid mono amide with 2-aminobenzenethiol. The intermediate maleic acid mono amides are a known class of compounds and are prepared by reacting maleic anhydride with the appropriate amine.

The process is carried out by heating a maleic acid mono amide with about one molar equivalent of 2-aminobenzenethiol at a temperature between about 50° C. and 150° C. The reaction can be carried out in any organic solvent miscible with an inert to the reactants but it is preferred to use pyridine.

Although the reaction proceeds at lower temperatures, the reaction is best carried at a temperature between about 50° C. and 150° C. Moreover, if a solvent is selected that boils in this range, as is preferred, it is convenient to conduct the reaction at the reflux temperature of the solvent. Under these conditions, the reaction is immediate as evidenced by the accumulation of water. It is not necessary to remove the water although it is preferred to separate it by azeotropic distillation.

The products are generally obtained as crystalline solids upon cooling the reaction mixture. The compounds are best obtained pure by recrystallization from a pyridine-water mixture.

It is often convenient to isolate the products by diluting the reaction mixture with any inert, stream-volatile organic solvent, e. g., ethyl alcohol, n-pentane, n-hexane, benzene etc. This gives a more readily filtrable solid in those instances where product precipitation causes the reaction mixture to set as a solid and hastens precipitation in those instances where the product is somewhat soluble in the reaction solvent.

The process for preparing the intermediate maleic acid mono-amides is known and is carried out by reacting the appropriate amine with about one molar equivalent of maleic anhydride at a temperature between about 20° C. and 50° C. The reaction is preferably carried out in any inert organic solvent and for instance diethyl ether or chloroform can be used.

The compounds of Formula I can also be prepared from 3-oxo-3,4-dihydro-1,4,2-benzothiazine-2-acetic acid and the appropriate amine.

In this case, the process is carried out by reacting the acid with about a one-half molar equivalent of a sulfonyl halide followed by the addition of the appropriate amine. The sulfonyl halide can be an alkyl or arylsulfonyl halide wherein the halogen can be chlorine, bromine or iodine. Thus, the sulfonyl halide includes such compounds as methylsulfonyl bromide, n-butylsulfonyl chloride and the like for alkylsulfonyl halides and benzenesulfonyl iodide, p-toluenesulfonyl chloride and the like for arylsulfonyl halides. The reaction is carried out at a temperature between about 0° C. and 30° C. in the presence of a solvent, pyridine for example, inert under the conditions used in carrying out the reaction. The excess acid is taken up with sodium hydroxide and the desired product collected by suction filtration.

Alternatively, the reaction can be carried out by converting 3-oxo-3,4-dihydro-1,4,2-benzothiazine-2-acetic acid to a mixed anhydride followed by addition of the appropriate amine. The reaction is carried out by mixing the acid with triethylamine and isobutylchloroformate at a temperature from −40° C. to about −10° C. and slowly adding the amine. The triethylamine hydrochloride is removed by filtration and the desired product recovered from the filtrate.

The structures of the compounds of the invention have been established by chemical analysis and the following series of reactions.

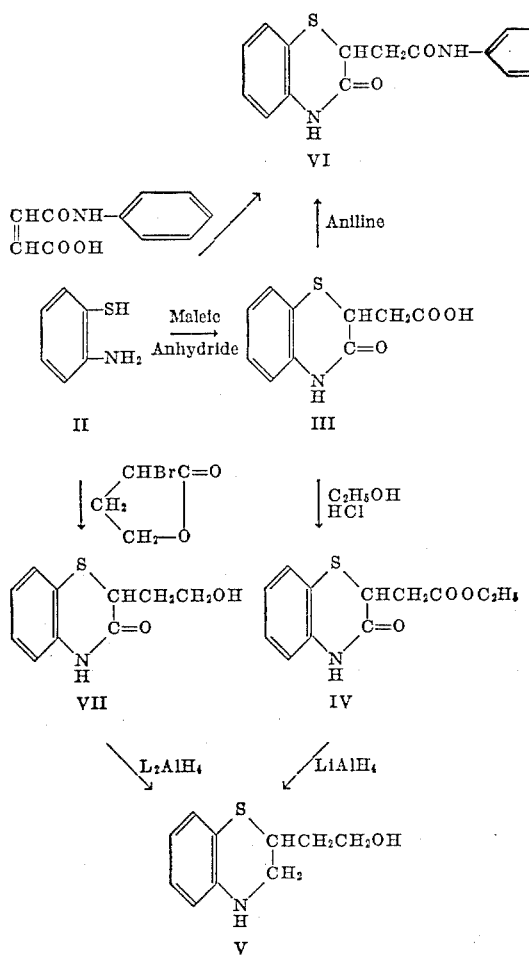

Thus, the structures of the amides are as shown since the amide obtained from 2-aminobenzenethiol and maleic acid monoamide is identical with that obtained from 3-oxo-3,4-dihydro-1,4,2-benzothiazine-2-acetic acid, the structure of which is presumed known in the literature but which in any event has been established here by the sequence III–V and the conversion of VII to V. The following examples will further illustrate the invention, without however limiting the same thereto.

INTERMEDIATES (a) *N-n-octylmaleamic acid.*—To a solution of 14.7 g. of maleic anhydride in 125 ml. of dry ether was slowly added a solution of 19.35 g. of n-octyl-amine in 100 ml. of absolute ether. An exothermic reaction took place and a white solid separated. The solid was collected by suction filtration, washed with dry ether and dried. After recrystallization from ethyl alcohol there was obtained 26.3 g. of N-n-octylmaleamic acid, M. P. 83–85° C. (corr.).

*Analysis.*—Calc'd. for $C_{12}H_{24}NO_3$: Carbon 63.40; hydrogen 9.31; nitrogen 6.16. Found: Carbon 63.42; hydrogen 9.27; nitrogen 6.05.

(b) N-cyclohexylmaleamic acid was prepared from cyclohexylamine and maleic anhydride using the procedure described about in Part *a*. The white crystals of N-cyclohexylmaleamic acid thus obtained has the M. P. 149–151° C. (corr.).

*Analysis.*—Calc'd. for $C_{10}H_{15}NO_3$: Carbon 60.89; hydrogen 7.67; nitrogen 7.10. Found: Carbon 61.10; hydrogen 7.57; nitrogen 6.93.

(c) *2,4-dichloromaleanilic acid.*—To a solution of 10 g. of maleic anhydride in 100 ml. of chloroform was added a solution of 16.2 g. of 2,4-dichloroaniline in 100 ml. of chloroform and the mixture warmed on a steam bath. The precipitate which formed was collected by suction filtration and washed with chloroform. After recrystallization from a chloroform-methyl alcohol mixture there was obtained 5 g. of N-2,4-dichloromaleanilic acid, M. P. 175–177° C. (corr.).

*Analysis.*—Calc'd. for $C_{10}H_7Cl_2NO_3$: Nitrogen 5.39; chlorine 27.26. Found: Nitrogen 5.39; chlorine 27.48.

(d) 4-fluoromaleanilic acid was prepared from 4-fluoroaniline and maleic anhydride using the manipulative procedure described above in Part *c*. The 4-fluoromaleanilic acid thus obtained had the M. P. 204–206° C. (corr.).

*Analysis.*—Calc'd. for $C_{10}H_8FNO_3$: Nitrogen 6.70; neutral equiv. 209. Found: Nitrogen 6.58, neutral equiv. 213.

(e) 2,5-dichloromaleanilic acid was prepared from 2,5-dichloroaniline and maleic anhydride using the manipulative procedure described above in Part *c*. The white crystals of 2,5-dichloro-maleanilic acid had the M. P. 144–146° C. (corr.).

*Analysis.*—Calc'd. for $C_{10}H_7Cl_2NO_3$: Nitrogen 5.39; chlorine 27.26. Found: Nitrogen 5.32; chlorine 27.05.

(f) 4-carbethoxymaleanilic acid was prepared from ethyl 4-amino-benzoate and maleic anhydride using the manipulative procedure described above in Part *a*. The 4-carbethoxymaleanilic acid was obtained as a light yellow power, M. P. 191–192° C. (corr.).

*Analysis.*—Calc'd. for $C_{13}H_{13}NO_5$: Nitrogen 5.32; neutral equiv. 263. Found: Nitrogen 5.36; neutral equiv. 263.

(g) 3,4-dichloromaleanilic acid was prepared from 3,4-dichloroaniline and maleic anhydride using the manipulative procedure described above in Part *c*. The pale yellow 3,4-dichloromaleanilic acid thus obtained had the M. P. 211–212° C. (corr.).

*Analysis.*—Calc'd. for $C_{10}H_7Cl_2NO_3$: Nitrogen 5.39; chlorine 27.26. Found: Nitrogen 5.28; chlorine 27.38.

(h) N-methylmaleanilic acid was prepared from N-methylaniline and maleic anhydride using the manipulative procedure described above in Part *a*. The white crystals of N-methylmaleanilic acid had the M. P. 83–93° C. (corr.).

*Analysis.*—Calc'd. for $C_{11}H_{11}NO_3$: Nitrogen 6.83; neutral equiv. 205. Found: Nitrogen 6.77; neutral equiv. 212.

(i) 4-methylmercaptomaleanilic acid was prepared from 4-amino-phenylmethylsulfide and maleic anhydride using the manipulative procedure described above in Part *a*. The 4-methylmercaptomaleanilic acid was obtained as a yellow solid, M. P. 175–178° C. (corr.).

*Analysis.*—Calc'd. for $C_{11}H_{11}NO_3S$: Nitrogen 5.90; neutral equiv. 237. Found: Nitrogen 5.80; neutral equiv. 231.

(j) 3-chloro-4-methylmaleanilic acid was prepared from 3-chloro-4-methylaniline and maleic anhydride using the manipulative procedure described above in Part *a*. The 3-chloro-4-methylmaleanilic acid was obtained as a yellow powder, M. P. 196–197° C. (corr.).

*Analysis.*—Calc'd. for $C_{11}H_{10}ClNO_3$: Nitrogen 5.84; chlorine 14.79. Found: Nitrogen 5.83; chlorine 14.74.

(k) 4-bromomaleanilic acid was prepared from 4-bromoaniline and maleic anhydride using the manipulative procedure described above in Part *a*. The yellow 4-bromomaleanilic acid had the M. P. 197–199° C. (corr.).

*Analysis.*—Calc'd. for $C_{10}H_8BrNO_3$: Nitrogen 5.19;

neutral equiv. 270. Found: Nitrogen 5.23; neutral equiv. 271.

(*l*) 2,3-dichloromaleanilic acid was prepared from 2,3-dichloroaniline and maleic anhydride using the manipulative procedure described above in Part *c*. The 2,3-dichloromaleanilic acid was obtained as a white powder, M. P. 138–139° C. (corr.).

*Analysis.*—Calc'd. for $C_{10}H_7Cl_2NO_3$: Nitrogen 5.39; neutral equiv. 260. Found: Nitrogen 5.34; neutral equiv. 262.

*Example 1.* — *2-(3-chlorophenylcarbamylmethyl)-3-oxo-3,4-dihydro-1,4,2-benzothiazine*

To a solution of 13 g. of 3-chloroaniline in 50 ml. of pyridine at 15° C. was added 10 g. of maleic anhydride and the solution allowed to warm to room temperature. After standing for five minutes, 12.5 g. of 2-aminobenzenethiol was added and the solution heated on a steam bath for one hour. Dilution of the solution with 150 ml. of benzene caused the separation of a solid which was collected by suction filtration after refluxing the suspension. After recrystallization from absolute ethyl alcohol, there was obtained 8 g. of 2-(3-chlorophenylcarbamylmethyl) - 3 - oxo - 3,4 - dihydro - 1,4,2 - benzothiazine, M. P. 229–230° C. (corr.).

*Analysis.*—Calc'd. for $C_{16}H_{13}ClN_2O_2S$: Nitrogen 8.42; sulfur 9.63. Found: Nitrogen 8.46; sulfur 9.43.

The 2-(3-chlorophenylcarbamylmethyl-3-oxo - 3,4 - dihydro-1,4,2-benzothiazine was found to possess antibacterial activity in vitro against *Staphylococcus aureus* and *Eberthella typhi* at dilutions of 1:10,000, when tested by standard serial dilution procedures.

*Example 2*

2 - cyclohexylcarbamylmethyl - 3 - oxo - 3,4 - dihydro-1,4,2-benzothiazine was prepared from cyclohexylamine, maelic anhydride and 2-aminobenzenethiol using the manipulative procedure described above in Example 1. After recrystallization from methanol-dioxane the 2-cyclohexylcarbamylmethyl - 3 - oxo - 3,4 - dihydro - 1,4,2 - benzothiazine was obtained as white crystals, M. P. 250–252° C. (corr.).

*Analysis.*—Calc'd. for $C_{16}H_{20}N_2O_2S$: Nitrogen 9.20; sulfur 10.53. Found: Nitrogen 9.17; sulfur 10.33.

*Example 3*

2 - (2 - chlorophenylcarbamylmethyl) - 3 - oxo - 3,4-dihydro-1,4,2-benzothiazine was prepared from 2-chloroaniline, maleic anhydride and 2-aminobenzenethiol using the manipulative procedure described above in Example 1. Recrystallization from a pyridine-alcohol water mixture gave 2-(2-chlorophenylcarbamylmethyl)-3-oxo-3,4-dihydro-1,4,2-benzothiazine as a white powder, M. P. 232–237° C. (corr.).

*Analysis.*—Calc'd. for $C_{16}H_{13}ClN_2O_2S$: Nitrogen 8.42; sulfur 9.63. Found: Nitrogen 8.31; sulfur 9.80.

*Example 4*

2 - (2,4 - dichlorophenylcarbamylmethyl) - 3 - oxo-3,4-dihydro-1,4,2-benzothiazine was prepared from 2,4-dichloroaniline, maleic anhydride and 2-aminobenzenethiol using the manipulative procedure described above in Example 1. Recrystallization from a pyridine-benzene-n-pentane mixture gave white crystals of 2-(2,4-dichlorophenylcarbamylmethyl) - 3 - oxo - 3,4 - dihydro - 1,4,2-benzothiazine, M. P. 241–242° C. (corr.).

*Analysis.*—Calc'd. for $C_{16}H_{12}Cl_2N_2O_2S$: Nitrogen 7.63; chlorine 19.31. Found: Nitrogen 7.50; chlorine 19.75.

The 2-(2,4-dichlorophenylcarbamylmethyl)-3-oxo-3,4-dihydro-1,4,2-benzothiazine was found to possess antibacterial activity in vitro against *Staph. aureus* and *E. typhi* at dilutions of 1:60,000.

*Example 5*

2 - (4 - carbethoxyphenylcarbamylmethyl) - 3 - oxo-3,4-dihydro-1,4,2-benzothiazine was prepared from 4-carbethoxyaniline, maleic anhydride and 2-aminobenzenethiol using the manipulative procedure described above in Example 1. The 2-(4-carbethoxyphenylcarbamylmethyl)-3-oxo-3,4-dihydro-1,4,2-benzothiazine thus obtained had the M. P. 205–206° C. (corr.).

*Analysis.*—Calc'd. for $C_{19}H_{18}N_2O_4S$: Nitrogen 7.56; carbon 61.60; hydrogen 4.90. Found: Nitrogen 7.42; carbon 61.84; hydrogen 4.90.

*Example 6*

2 - (4 - ethoxyphenylcarbamylmethyl) - 3 - oxo - 3,4-dihydro-1,4,2-benzothiazine was prepared from 4-ethoxyaniline, maleic anhydride and 2-aminobenzenethiol using the manipulative procedure described above in Example 1. The 2-(4-ethoxyphenylcarbamylmethyl)-3-oxo-3,4-dihydro-1,4,2-benzothiazine was obtained, after recrystallization from pyridine-benzene as a white solid, M. P. 267–269° C. (corr.).

*Analysis.*—Calc'd. for $C_{18}H_{18}N_2O_3S$: Nitrogen 8.18; sulfur 9.36. Found: Nitrogen 8.12; sulfur 9.65.

According to the manipulative procedures described in the above examples 2-cyclopentylcarbamylmethyl-3-oxo-3,4-dihydro-1,4,2-benzothiazine can be prepared by reacting cyclopentylamine, maleic anhydride and 2-aminobenzenethiol; 2-(2,4-dibutoxyphenylcarbamyl)-3-oxo-3,4-dihydro-1,4,2-benzothiazine can be prepared by reacting 2,4-dibutoxyaniline, maleic anhydride and 2-aminobenzenethiol; 2-dibutylcarbamylmethyl-3-oxo-3,4-dihydro-1,4,2-benzothiazine can be prepared by reacting dibutylamine, maleic anhydride and 2-aminobenzenethiol; 2-(2,3,5 - trimethylphenylcarbamylmethyl) - 3 - oxo - 3,4 - dihydro-1,4,2-benzothiazine can be prepared by reacting 2,3,5-trimethylaniline, maleic anhydride and 2-aminobenzenethiol; and 2-(3-carbopropoxyphenylcarbamylmethyl)-3-oxo-3,4-dihydro-1,4,2-benzothiazine can be prepared by reacting 3-carbopropoxyaniline, maleic anhydride and 2-aminobenzenethiol.

*Example 7.* — *2 - (3 - chloro - 4 - methylphenylcarbamylmethyl)-3-oxo-3,4-dihydro-1,4,2-benzothiazine*

To a suspension of 120 g. of 3-chloro-4-methylmaleanilic acid in 100 ml. of pyridine was added 63 g. of 2-aminobenzenethiol. After warming on a steam bath for five minutes the mixture set to a solid. The solid was broken up, suspended in 300 ml. of benzene and the suspension refluxed for fifteen minutes. The solid product was collected by suction filtration and washed with benzene. The 70 g. of 2-(3-chloro-4-methylphenylcarbamylmethyl) - 3 - oxo - 3,4 - dihydro - 1,4,2 - benzothiazine obtained after recrystallization from pyridine-water had the M. P. 240–242° C. (corr.).

*Analysis.*—Calc'd. for $C_{17}H_{15}ClN_2O_2S$: Nitrogen 8.08; chlorine 10.22. Found: Nitrogen 8.00; chlorine 10.19.

*Example 8*

2 - (4 - bromophenylcarbamylmethyl) - 3 - oxo - 3,4-dihydro-1,4,2-benzothiazine was prepared by reacting 4-bromomaleanilic acid with 2-aminobenzenethiol using the manipulative procedure described above in Example 7. The 2-(4-bromophenylcarbamylmethyl)-3-oxo-3,4-dihydro-1,4,2-benzothiazine thus produced had the M. P. 284–285° C. (corr.).

*Analysis.*—Calc'd. for $C_{16}H_{13}BrN_2O_2S$: Nitrogen 7.43; sulfur 8.50. Found: Nitrogen 8.50; sulfur 8.31.

*Example 9*

2-(3,4-dichlorophenylcarbamylmethyl)-oxo-3,4 - dihydro-1,4,2-benzothiazine was prepared by reacting 3,4-dichloromaleanilic acid with 2-aminobenzenethiol using the procedure described above in Example 7. The 2-(3, 4 - dichlorophenylcarbamylmethyl)-3-oxo-3,4-dihydro-1, 4,2-benzothiazine thus produced had the M. P. 242–244° C. (corr.).

*Analysis.*—Calc'd for $C_{16}H_{12}Cl_2N_2O_2S$: Nitrogen 7.63; chlorine 19.31. Found: Nitrogen 7.59; chlorine 19.56.

The 2-(3,4-dichlorophenylcarbamylmethyl)-3-oxo-3,4-dihydro-1,4,2-benzothiazine was found to possess antifungal activity in vitro as follows when tested by standard serial dilution procedures:

| Organism | Maximum Effective Dilution | |
|---|---|---|
| | Fungistatic | Fungicidal |
| T. interdigitale | 1:50,000 | 1:50,000 |
| T. mentagrophytes | 1:66,000 | 1:50,000 |
| As. niger | 1:66,000 | 1:50,000 |
| T. gypseum | 1:50,000 | |
| Monilia albicans | 1:50,000 | 1:50,000 |

Example 10

2-(2,3-dichlorophenylcarbamylmethyl) - 3-oxo-3,4-dihydro-1,4,2-benzothiazine was prepared from 2,3-dichloromaleanilic acid and 2-aminobenzenthiol using the manipulative procedure described above in Example 7. The 2-(2,3-dichlorophenylcarbamylmethyl)-3-oxo - 3,4-dihydro-1,4,2-benzothiazine thus obtained had the M. P. 270–272° C. (corr.).

*Analysis.*—Calc'd for $C_{16}H_{12}Cl_2N_2O_2S$: Nitrogen 7.63; chlorine 19.31. Found: Nitrogen 7.56; chlorine 19.44.

Example 11

2-(4-methylmercaptophenylcarbamylmethyl) - 3-oxo-3,4-dihydro-1,4,2-benzothiazine was prepared from 4-methylmercaptomaleanilic acid and 2-aminobenzenethiol using the manipulative procedure described above in Example 7. The 2-(4-methylmercaptophenylcarbamylmethyl)-3-oxo-3,4-dihydro-1,4,2-benzothiazine was obtained as a yellow solid, M. P. 263–265° C. (corr.).

*Analysis.*—Calc'd for $C_{17}H_{16}N_2O_2S_2$: Nitrogen 8.13; sulfur 18.62. Found: Nitrogen 8.01; sulfur 19.00.

Example 12

2-n-octylcarbamylmethyl - 3-oxo-3,4-dihydro - 1,4,2-benzothiazine was prepared from n-octylmaleamic acid and 2-aminobenzenethiol using the manipulative procedure described above in Example 7. The 2-n-octylcarbamylmethyl-3-oxo-3,4-dihydro-1,4,2-benzothiazine obtained after recrystallization from methyl alcohol had the M. P. 188–191° C. (corr.).

*Analysis.*—Calc'd for $C_{18}H_{26}N_2O_2S$: Nitrogen 8.38; sulfur 9.58. Found: Nitrogen 8.18; sulfur 9.51.

Example 13

2 - diethylcarbamylmethyl-3-oxo-3,4 - dihydro - 1,4,2-benzothiazine was prepared from N,N-diethylmaleamic acid and 2-aminobenzenethiol using the manipulative procedure described above in Example 7. After recrystallization from methanol, the 2-diethylcarbamylmethyl-3-oxo-3,4-dihydro-1,4,2-benzothiazine was obtained as white crystals, M. P. 156–158° C. (corr.)

*Analysis.*—Calc'd for $C_{14}H_{18}N_2O_2S$: Nitrogen 10.07; sulfur 11.52. Found: Nitrogen 10.11; sulfur 11.33.

Example 14

2-(4-fluorophenylcarbamylmethyl)-3 - oxo-3,4-dihydro-1,4,2-benzothiazine was prepared from 4-fluoromaleanilic acid and 2-aminobenzenethiol using the manipulative procedure described above in Example 7. The 2-(4-fluorophenylcarbamylmethyl) - 3 - oxo-3,4,dihydro - 1,4,2-benzothiazine was obtained, after recrystallization from a pyridine-benzene-n-pentane mixture, as a white solid, M. P. 267–270° C. (corr.).

*Analysis.*—Calc'd for $C_{16}H_{13}FN_2O_2S$: Nitrogen 8.86; sulfur 10.13. Found: Nitrogen 8.75; sulfur 10.76.

2-(4-fluorophenylcarbamylmethyl)-3 - oxo-3,4-dihydro-1,4,2-benzothiazine was found to possess antifungal activity in vitro as follows:

| Organism | Maximum Effective Dilution | |
|---|---|---|
| | Fungistatic | Fungicidal |
| T. interdigitale | 1:66,000 | 1:66,000 |
| T. mentagrophytes | 1:66,000 | 1:66,000 |
| As. niger | 1:50,000 | |
| T. gypseum | 1:66,000 | 1:50,000 |
| Monilia albicans | 1:50,000 | 1:50,000 |

Example 15

2-(2,5-dichlorophenylcarbamylmethyl) - 3 - oxo-3,4-dihydro-1,4,2-benzothiazine was prepared from 2,5-dichloromaleanilic acid and 2-aminobenzenethiol using the manipulative procedure described above in Example 7. The 2 - (2,5-dichlorophenylcarbamylmethyl)-3-oxo-3,4-dihydro-1,4,2-benzothiazine was obtained, after recrystallization from a pyridine-benzene-n-pentane mixture, as a white solid, M. P. 261–265° C. (corr.).

*Analysis.*—Calc'd for $C_{16}H_{12}Cl_2N_2O_2S$: Carbon 52.32; hydrogen 3.29; nitrogen 7.63. Found: Carbon 52.50; hydrogen 3.07; nitrogen 7.55.

2-(2,5-dichlorophenylcarbamylmethyl-3-oxo-3,4-dihydro-1,4,2-benzothiazine was found to possess antibacterial activity in vitro against *Staph. aureus* and *E. typhi* at dilutions of 1:90,000.

Example 16

2-methylphenylcarbamylmethyl-3-oxo - 3,4 - dihydro-1,4,2-benzothiazine was prepared from N-methylmaleanilic acid and 2-aminobenzenethiol using the manipulative procedure described above in Example 7. The 2-methylphenylcarbamylmethyl - 3 - oxo-3,4-dihydro-1,4,2-benzothiazine was obtained, after recrystallization from an ethyl alcholo-benzene-n-pentane mixture, as white crystals M. P. 172–173° C. (corr.).

*Analysis.*—Calc'd. for $C_{17}H_{16}N_2O_2S$: Nitrogen 8.97; sulfur 10.26. Found: Nitrogen 8.86; sulfur 10.20.

2-methylphenylcarbamylmethyl-3-oxo -3,4-dihydro-1,4,2-benzothiazine was found to possess antibacterial activity against *Staph. aureaus* and *E. typhi* at dilutions of 1:1000.

Example 17

2-carbamylmethyl-3-oxo-3,4-dihydro-1,4,2 - benzothiazine was prepared from maleamic acid and 2-aminobenzenethiol using the manipulative procedure described above in Example 7. The 2-carbamylmethyl-3-oxo-3,4-dihydro-1,4,2-benzothiazine was obtained, after recrystallization from ethyl alcohol, as a white solid, M. P. 223–225° C. (corr.).

*Analysis.*—Calc'd for $C_{10}H_{10}N_2O_2S$: Nitrogen 12.61; sulfur 14.42. Found: Nitrogen 12.38; sulfur 14.62.

Example 18.—2-phenylcarbamylmethyl-3-oxo-3,4-dihydro-1,4,2-benzothiazine

A solution of 4.4 g. of 3-oxo-3,4-dihydro-1,4,2-benzothiazine-2-acetic acid and 1.8 g. of benzenesulfonyl chloride in 15 ml. of pyridine was allowed to stand at room temperature for five minutes. The solution was cooled to 10° C. and 0.9 g. of aniline added while keeping the temperature at 10–15° C. The solution was allowed to warm to room temperature and finally heated on a steam bath for one minute. After cooling the mixture, 50 ml. of 5% sodium hydroxide was added and the solid product which formed was collected by suction filtration and washed with water. Recrystallization from a pyridine-water mixture gave 1.8 g. of 2-phenylcarbamylmethyl-3-oxo-3,4-dihydro-1,4,2-benzothiazine, M. P. 265–270° C. (corr.).

*Analysis.*—Calc'd for $C_{16}H_{14}N_2O_2S$: Nitrogen 9.39; sulfur 10.75. Found: Nitrogen 9.39; sulfur 10.48.

The 2-phenylcarbamylmethyl-3-oxo-3,4-dihydro-1,4,2-benzothiazine was also prepared from maleanilic acid and 2-aminobenzenethiol using the manipulative procedure described above in Example 7. There was no depression of the melting point when this material was mixed with the product obtained above by reacting 3-oxo-3,4-dihydro-1,4,2-benzothiazine-2-acetic acid, benzenesulfonyl chloride and aniline, establishing the identity of the two products.

Similarly, 2 - (4 - ethoxyphenylcarbamylmethyl) - 3-oxo-3,4-dihydro-1,4,2-benzothiazine was prepared by reacting 3 - oxo - 3,4 - dihydro - 1,4,2 - benzothiazine - 2-acetic acid, benzenesulfonyl chloride and 4-ethoxyaniline. There was no depression of the melting point when this material was mixed with the product obtained in Example 6, establishing the identity of the two products.

According to the manipulative procedure described in the above example, 2 - isohexylcarbamylmethyl - 3 - oxo-3,4 - dihydro - 1,4,2 - benzothiazine can be prepared by reacting 3 - oxo - 3,4 - dihydro - 1,4,2 - benzothiazine - 2-acetic acid with methyl sulfonyl bromide and isohexylamine; 2 - (propyl - 2,4,6 - trichlorophenylcarbamylmethyl) - 3 - oxo - 3,4 - dihydro - 1,4,2 - benzothiazine can be prepared by reacting 3 - oxo - 3,4 - dihydro - 1,4,2-benzothiazine - 2 - acetic acid with p-toluenesulfonyl iodide and N-propyl - 2,4,6 - trichloroaniline; 2 - (ethyl-2,6 - dimethylcyclohexylcarbamylmethyl) - 3 - oxo - 3,4-dihydro - 1,4,2 - benzothiazine can be prepared by reacting 3 - oxo - 3,4 - dihydro - 1,4,2 - benzothiazine - 2-acetic acid with n-butylsulfonyl bromide and N-ethyl-2,6 - dimethylcyclohexylamine; 2 - (2,6 - dibromo - 4-iodophenylcarbamylmethyl) - 3 - oxo - 3,4 - dihydro-1,4,2 - benzothiazine can be prepared by reacting 3 - oxo-3,4 - dihydro - 1,4,2 - benzothiazine - 2 - acetic acid with benzenesulfonyl iodide and 2,6 - dibromo - 4 - iodoaniline; and 2 - (methyl - 2,4 - dimethylsulfonylphenylcarbamylmethyl) - 3 - oxo - 3,4 - dihydro - 1,4,2-benzothiazine can be prepared by reacting 3 - oxo - 3,4 - dihydro - 1,4,2-benzothiazine - 2 - acetic acid with methylsulfonyl chloride and N - methyl - 2,4 - dimethylsulfonylaniline.

*Example 19.—2-(4-chlorophenylcarbamylmethyl)-3-oxo-3,4-dihydro-1,4,2-benzothiazine*

In a three-necked flask equipped with a mechanical stirrer and internal thermometer was placed 22.3 g. of 3 - oxo - 3,4 - dihydro - 1,4,2 - benzothiazine - 2 - acetic acid and 10 g. of triethylamine in 800 ml. of dry acetone. The solution was cooled to about —40° C. and 13.6 g. of isobutylchloroformate in 50 ml. of dry acetone was added with stirring. After stirring the clear solution for one hour, a solution of 12.7 g. of 4-chloroaniline in 50 ml. of dry acetone was added dropwise as the temperature slowly rose to 0° C. and finally to room temperature when the coolant was removed. The supernatant liquid was removed from the triethylamine hydrochloride and evaporated to an oily solid. This was suspended in water, collected by suction filtration and washed with water and absolute diethyl ether. Two recrystallizations from a pyridine-water mixture gave .4 g. of 2-(4-chlorophenylcarbamylmethyl) - 3 - oxo - 3,4 - dihydro - 1,4,2-benzothiazine, M. P. 276–282° C. (corr.).

*Analysis.*—Calc'd for $C_{16}H_{13}ClN_2O_2S$: Nitrogen 8.42; sulfur 9.63. Found: Nitrogen 8.60; sulfur 9.57.

The 2 - (4 - chlorophenylcarbamylmethyl) - 3 - oxo-3,4 - dihydro - 1,4,2 - benzothiazine obtained in the above example showed no melting point depression when mixed with the product obtained by reacting 4-chloromaleanilic acid and 2-aminobenzenethiol using the procedure described in Example 7, thus establishing the identity of the two products.

2 - (4 - chlorophenylcarbamylmethyl) - 3 - oxo - 3,4-dihydro - 1,4,2 - benzothiazine was found to possess antifungal activity in vitro as follows:

| Organism | Maximum Effective Dilution | |
|---|---|---|
| | Fungistatic | Fungicidal |
| *T. interdigitale* | 1:20,000 | 1:13,000 |
| *T. mentagrophytes* | 1:20,000 | 1:13,000 |
| *As. niger* | 1:13,000 | 1:10,000 |
| *T. gypseum* | 1:13,000 | 1:10,000 |
| *Monilia albicans* | 1:13,000 | 1:10,000 |

*Example 20.—2-(4-carbohydrazidophenylcarbamyl methyl)-3-oxo-3,4-dihydro-1,4,2-benzothiazine*

To a filtered solution of 15 g. of 2 - (4 - carbethoxyphenylcarbamylmethyl) - 3 - oxo - 3,4 - dihydro - 1,4,2-benzothiazine (Example 5) in 350 ml. of hot absolute ethyl alcohol was added a solution of 30 ml. of 85% hydrazine hydrate in 20 ml. of absolute ethyl alcohol. The solution was refluxed for five hours then allowed to evaporate slowly at room temperature. The pasty solid was suspended in hot absolute ethyl alcohol, filtered and the solid resuspended in pyridine. The product was collected by suction filtration, washed with water, ethyl alcohol and diethyl ether and dried at 75° C. The 7.5 g. of 2 - (4 - carbohydrazidophenylcarbamylmethyl) - 3-oxo - 3,4 - dihydro - 1,4,2 - benzothiazine thus obtained had the M. P. 261–263° C. (corr.).

*Analysis.*—Calc'd. for $C_{17}H_{16}N_4O_3S$: Nitrogen 15.72; sulfur 8.99. Found: Nitrogen 15.50; sulfur 8.77.

According to the manipulative procedures described in the above examples 2 - (ethyl - 4 - iodophenylcarbamylmethyl) - 3 - oxo - 3,4 - dihydro - 1,4,2 - benzothiazine can be prepared by reacting N - ethyl - 4 - iodoaniline, maleic anhydride and 2 - aminobenzenethiol; 2 - (4-chloro - 2,5 - diethoxyphenylcarbamylmethyl) - 3 - oxo-3,4 - dihydro - 1,4,2 - benzothiazine can be prepared by reacting maleic acid, 4 - chloro - 2,5 - diethoxyaniline and 2 - aminobenzenethiol; 2 - (isopropyl - 3,5 - diiodophenylcarbamylmethyl) - 3 - oxo - 3,4 - dihydro - 1,4,2-benzothiazine can be prepared by reacting 3 - oxo - 3,4-dihydro - 1,4,2 - benzothiazine - 2 - acetic acid with N-isopropyl - 3,5 - diiodoaniline in the presence of p-toluenesulfonyl chloride; and 2 - (2 - carbohydrazidophenylcarbamylmethyl) - 3 - oxo - 3,4 - dihydro - 1,4,2-benzothiazine can be prepared by reacting 2 - (2 - carbethoxyphenylcarbamylmethyl) - 3 - oxo - 3,4 - dihydro-1,4,2 - benzothiazine, prepared by reacting maleic anhydride, 2 - carbethoxyaniline and 2 - aminobenzenethiol, with hydrazine hydrate.

*Example 21.—2-carbethoxymethyl-3-oxo-3,4-dihydro-1,4,2-benzothiazine*

A. FROM DIETHYL MALEATE AND 2-AMINOBENZENETHIOL

A three-necked flask equipped with internal thermometer, Dean-Stark water separator, and dropping funnel and containing 51 g. of diethyl maleate was heated to 190° C. under an atmosphere of nitrogen. To this solution was slowly added 37.5 g. of 2-aminobenzenethiol. The temperature rose to 215° C. while 14 ml. of ethyl alcohol was collected. The solution was cooled and the solid which formed was collected by suction filtration and dissolved in hot absolute ethyl alcohol. Dilution of the resultant solution with two volumes of n-pentane caused the precipitation of a solid which was collected by suction filtration and dried. There was thus obtained 64 g. of 2-carbethoxymethyl-3-oxo-3,4-dihydro-1,4,2-benzothiazine, M. P. 127–128° C. (corr.).

*Analysis.*—Calc'd. for $C_{12}H_{13}NO_3S$: Nitrogen 5.57; sulfur 12.76. Found: Nitrogen 5.48; sulfur 12.51.

B. FROM 3-OXO-3,4-DIHYDRO-1,4,2-BENZOTHIAZINE-2-ACETIC ACID

A suspension of 4.5 g. of 3-oxo-3,4-dihydro-1,4,2- benzothiazine-2-acetic acid in 50 ml. of absolute ethyl alcohol saturated with hydrogen chloride, was warmed on a steam bath until solution was complete. The white needles which separated after the solution was cooled were collected and washed well with water. The dry product had the M. P. 126–127° C. and showed no melting point depression when mixed with a sample of the product obtained above in part A, thus establishing the identity of the two products.

*Example 22.—2-(2-hydroxyethyl)-3-oxo-3,4-dihydro-1,4,2-benzothiazine*

To a solution of 16.5 g. of α-bromo-γ-butyrolactone in 25 ml. of absolute ethyl alcohol was added 12.5 g. of 2-aminobenzenethiol. After the exothermic reaction which took place had subsided, the solution was heated on a steam bath for fifteen minutes, then neutralized with sodium bicarbonate. Dilution with water caused the separation of an oil which solidified after standing for several days at room temperature. The solid product was collected by suction filtration, dried and recrystallized from an absolute ethyl alcohol-n-pentane mixture. The 2-(2-hydroxyethyl)-3-oxo-3,4-dihydro-1,4,2-benzothiazine thus obtained had the M. P. 105–106° C. (corr.).

*Analysis.*—Calc'd. for $C_{10}H_{11}NO_2S$: Nitrogen 6.69; sulfur 15.32. Found: Nitrogen 6.63; sulfur 15.21.

*Example 23.—2-(2-hydroxyethyl)-3,4-dihydro-1,4,2-benzothiazine hydrochloride*

A. FROM 2-CARBETHOXYMETHYL-3-OXO-3,4-DIHYDRO-1,4,2-BENZOTHIAZINE

To a suspension of 6.5 g. of lithium aluminum hydride in 600 ml. of anhydrous diethyl ether was added 25 g. of 2 - carbethoxymethyl - 3 - oxo - 3,4 - dihydro - 1,4,2-benzothiazine and the suspension stirred and refluxed for three hours. The excess reductant and the complex salts were decomposed with 20 ml. of ethyl alcohol, 20 ml. of water and 2 ml. of glacial acetic acid. The suspension was filtered by suction and the filtrate dried over anhydrous magnesium sulfate. Addition of ethereal hydrogen chloride to the dried ether solution precipitated an oil which solidified when triturated with dry ether. After recrystallization for an absolute ethyl alcohol-absolute diethyl ether mixture there was obtained 12 g. of 2 - (2 - hydroxyethyl) - 3,4 - dihydro - 1,4,2 - benzothiazine hydrochloride, M. P. 145–148° C. (corr.).

*Analysis.*—Calc'd. for $C_{10}H_{13}NOS$—HCl: Nitrogen 6.04; sulfur 13.83. Found: Nitrogen 6.02; sulfur 13.88.

B. FROM 2-(2-HYDROXYETHYL)-3-OXO-3,4-DIHYDRO-1,4,2-BENZOTHIAZINE

To as suspension of 1 g. of lithium aluminum hydride in 300 ml. of anhydrous diethyl ether was added a slurry of 4 g. of 2-(2-hydroxyethyl)-3-oxo-3,4-dihydro-1,4,2-benzothiazine. The reaction was carried out and the product isolated in the same way as described in part A of this example. The product thus obtained showed no melting point depression when mixed with a sample of the product obtained in part A, thus establishing the identity of the two products.

The 3-oxo-3,4-dihydro-1,4,2-benzothiazine-2-acetic acid amides were found to have fungistatic and fungicidal activity in vitro when tested according to conventional serial dilution procedures against various fungi, for example, *Trichophyton interdigitale*, *Trichophyton mentagrophytes*, *Aspergillus niger*, *Trichophyton gypseum* and *Monilia albicans*; and bacteriostatic and bactericidal activity in vitro against such organisms as *Staphylococcus aureus* and *Eberthella typhi*.

The compositions are preferably employed topically; and they can be compounded with well-known extenders, binders or other excipients and employed in the form of a powder, liquid, ointment or salve or any other vehicular form suitable for administering antifungal and antibacterial agents. The compounds of the invention are preferably formulated in these various vehicular forms in dilutions of about 1:1000 to about 1:100,000.

I claim:
1. A compound having the formula

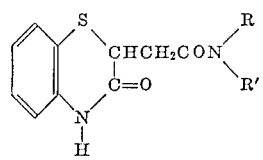

wherein R is a member selected from the group consisting of hydrogen, alkyl and cycloalkyl; and R' is a member selected from the group consisting of hydrogen, alkyl, unsubstituted phenyl and phenyl substituted by from one to three lower-alkyl, lower-alkoxy, lower-alkylmercapto, lower-alkylsulfonyl, carbo-lower-alkoxy, carbohydrazido and halogen.

2. 2-(3,4-dichlorophenylcarbamylmethyl) - 3-oxo - 3,4-dihydro-1,4,2-benzothiazine.

3. 2-(2,5-dichlorophenylcarbamylmethyl) - 3-oxo - 3,4-dihydro-1,4,2-benzothiazine.

4. 2-(4-fluorophenylcarbamylmethyl) - 3 - oxo - 3,4-dihydro-1,4,2-benzothiazine.

5. 2-(3-chloro-4-methylphenylcarbamylmethyl) - 3 - oxo-3,4-dihydro-1,4,2-benzothiazine.

6. The process for preparing a compound having the formula

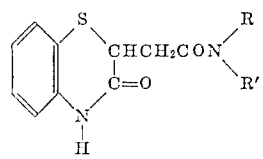

wherein R is a member selected from the group consisting of hydrogen, alkyl and cycloalkyl; and R' is a member selected from the group consisting of hydrogen, alkyl, unsubstituted phenyl and phenyl substtiuted by from one to three lower-alkyl, lower-alkoxy, lower-alkylmercapto, lower-alkylsulfonyl, carbo-lower-alkoxy, carbohydrazido and halogen, which comprises heating a compound having the formula

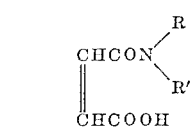

with 2-aminobenzenethiol in an inert solvent at a temperature between about 50° C. and 150° C.

7. The process for preparing a compound having the formula

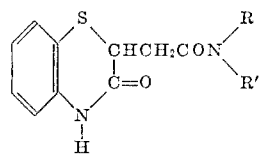

wherein R is a member of the class consisting of hydrogen, alkyl and cycloalkyl and R' is a member of the class consisting of hydrogen, alkyl, unsubstituted phenyl and phenyl substituted by from one to three groups selected from the class consisting of lower-alkyl, lower-alkoxy, lower-alkylmercapto, lower-alkysulfonyl, carbo-lower-alkoxy, carbohydrazido and halogen, which comprises treating a compound having the formula

with 3-oxo-3,4-dihydro-1,4,2-benzothiazine-2-acetic acid in the presence of a sulfonyl halide wherein the halide is selected from the group consisting of chlorine, bromine and iodine in an inert solvent at a temperature between about 0° C. and 30° C.

8. The process for preparing a compound having the formula

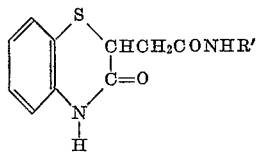

wherein R' is a phenyl radical substituted by from one to three halogen atoms, which comprises heating a compound having the formula

with 2-aminobenzenethiol in an inert solvent at a temperature between about 50° C. and 150° C.

9. The process for preparing a compound having the formula

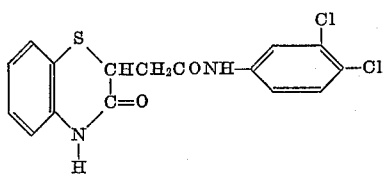

which comprises heating 3,4-dichloromaleanilic acid with 2-aminobenzenethiol in an inert solvent at a temperature between about 50° C. and 150° C.

10. The process for preparing a compound having the formula

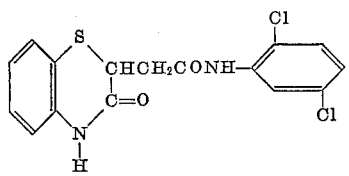

which comprises heating 2,5-dichloromaleanilic acid with 2-aminobenzenethiol in an inert solvent at a temperature between about 50° C. and 150° C.

11. The process for preparing a compound having the formula

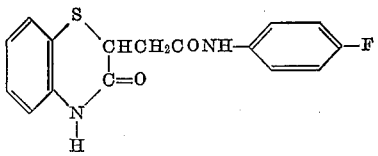

which comprises heating 4-fluoromaleanilic acid with 2-aminobenzenethiol in an inert solvent at a temperature between about 50° C. and 150° C.

12. The process for preparing a compound having the formula

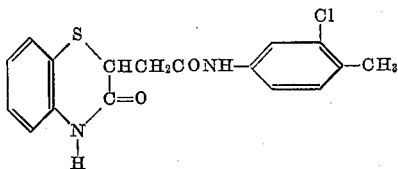

which comprises heating 3-chloro-4-methylmaleanilic acid with 2-aminobenzenethiol in an inert solvent at a temperature between about 50° C. and 150° C.

13. 2-phenylcarbamylmethyl-3-oxo-3,4-dihydro - 1,4,2 - benzothiazine wherein the phenyl radical is substituted by from one to three halogen atoms.

References Cited in the file of this patent

Mills et al.: J. Chem. Soc., 1927 (part 3), pages 2738–2752.

Anschutz: Annalen der Chemie, vol. 461, pages 158 and 160 (1928).

UNITED STATES PATENT OFFICE

CERTIFICATE OF CORRECTION

Patent No. 2,863,864                                                    December 9, 1958

Frederick K. Kirchner

It is hereby certified that error appears in the printed specification of the above numbered patent requiring correction and that the said Letters Patent should read as corrected below.

Column 2, line 21, for "an" read -- and --; line 38, for "stream-volatile" read -- steam-volatile --; column 4, line 1, for "has" read -- had --; line 36, for "power" read -- powder --; lines 50 and 51, for "83-93° C." read -- 88-93° C. --; column 5, line 28, for "2-(3-chlorophenylcarbamylmethyl-3-oxo" read -- 2-(3-chlorophenylcarbamylmethyl)-3-oxo --; line 37, for "maelic" read -- maleic --; column 6, line 69, for "2-(3,4-dichlorophenylcarbamylmethyl)-oxo" read -- 2-(3,4-dichlorophenylcarbamylmethyl)-3-oxo --; column 7, line 74, for "$S_{16}H_{13}FN_2O_2S$" read -- $C_{16}H_{13}FN_2O_2S$ --; column 8, line 29, for "2-(2,5-dichlorophenylcarbamylmethyl-3-oxo" read -- 2-(2,5-dichlorophenylcarbamylmethyl)-3-oxo --; column 8, line 41, for "alcholo" read -- alcohol --.

Signed and sealed this 14th day of April 1959.

(SEAL)
Attest:

KARL H. AXLINE                                                   ROBERT C. WATSON

Attesting Officer                                           Commissioner of Patents